UNITED STATES PATENT OFFICE.

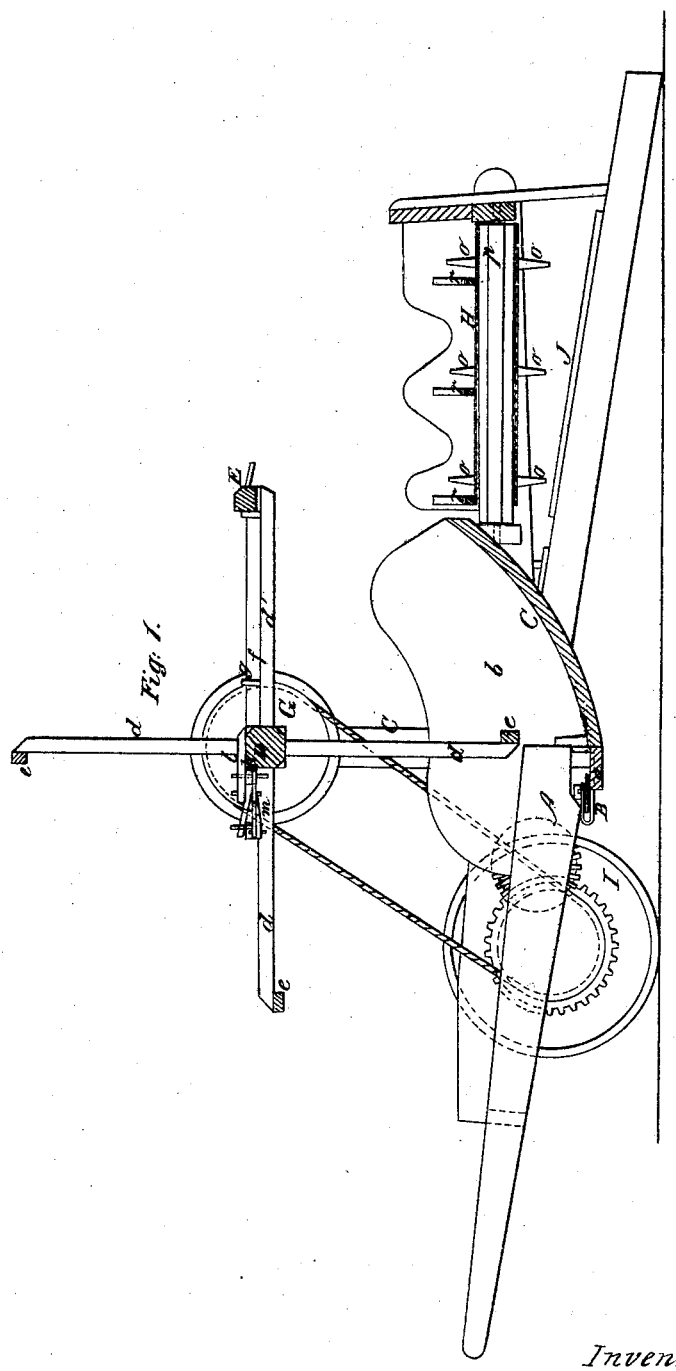

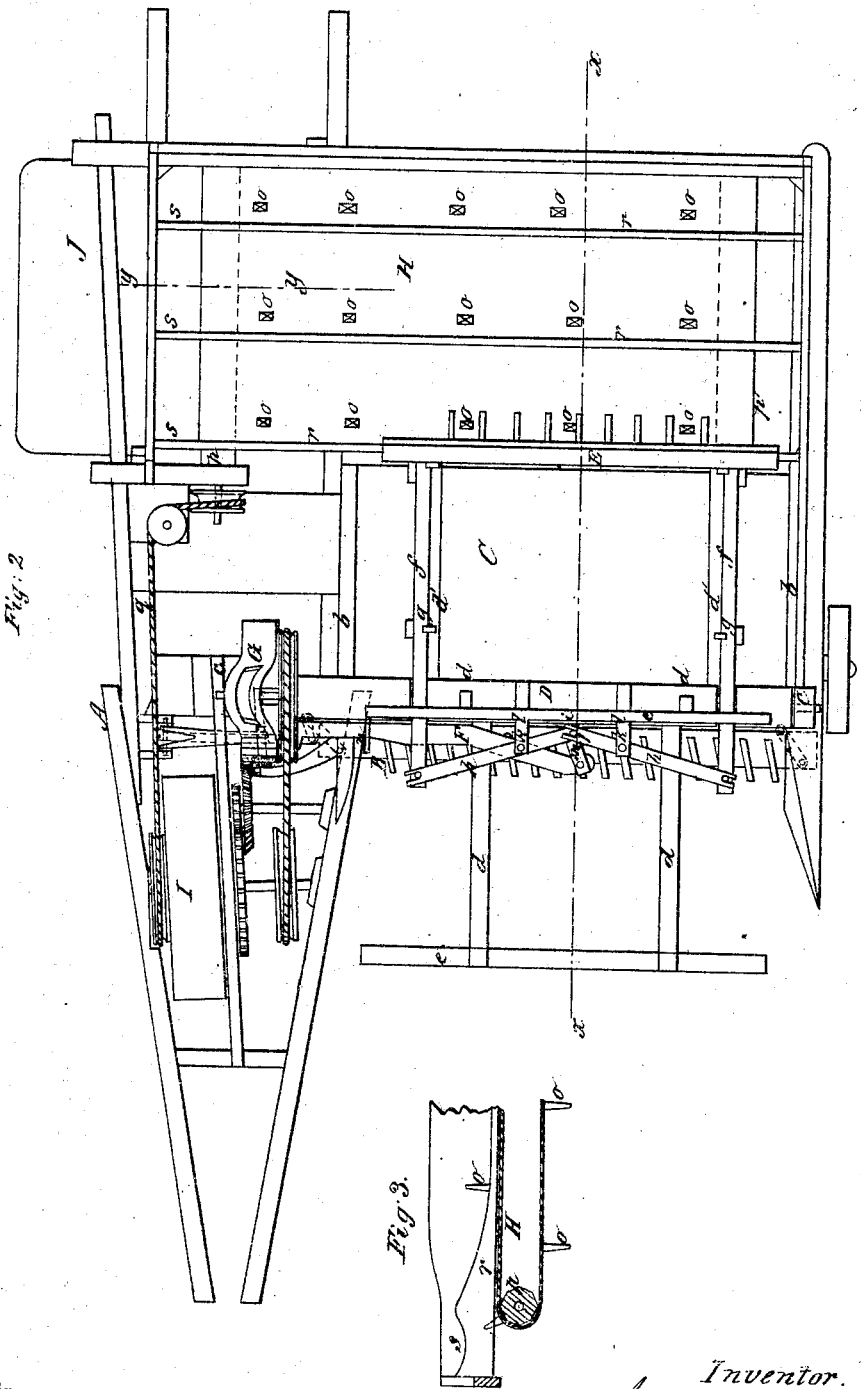

J. B. McCORMICK, OF ST. LOUIS, MISSOURI.

IMPROVEMENT IN HARVESTERS.

Specification forming part of Letters Patent No. 38,596, dated May 19, 1863.

*To all whom it may concern:*

Be it known that I, J. B. McCORMICK, of St. Louis, in the county of St. Louis and State of Missouri, have invented a new and useful Improvement in Grain-Harvesters; and I do hereby declare that the following is a full, clear, and exact description of the same, reference being had to the accompanying drawings, making a part of this specification, in which—

Figure 1 is a side sectional view of my invention, taken in the line $x\ x$, Fig. 2; Fig. 2, a plan or top view of the same; Fig. 3, a section of a portion of the same, taken in the line $y\ y$, Fig. 2.

Similar letters of reference indicate corresponding parts in the several figures.

This invention relates to a new and improved raking and carrying or discharging device to be applied to grain-harvesters, as hereinafter fully shown and described, whereby the cut grain may be delivered to the binders, who are on the machine and bind the gavels as they are presented to them.

The object of the invention is to obtain a labor-saving attachment for harvesters which will materially reduce the cost of harvesting grain.

To enable those skilled in the art to fully understand and construct my invention, I will proceed to describe it.

A represents the main frame, and B the sickle or cutting apparatus, of a harvester. These parts may be constructed as usual, and therefore do not require a minute description.

C represents a concave platform, which may be a segment of a hollow cylinder, or it may be of an elliptical form. This platform extends from the back edge of the finger-bar $a$ upward to a point which is sufficiently elevated to discharge the grain from. The platform has a vertical side piece or guard, $b$, at each end of it.

D represents a reel-shaft, the journals of which are fitted in suitable uprights, $c\ c'$, one of which is attached to the main frame of the machine and the other to the outer guard, $b$. The shaft D is provided with radial arms $d\ d'$, four pairs of them at equal distances apart, and three pairs of these arms, $d$, have beaters $e$ attached to their ends, said beaters being parallel with the shaft D and at equal distances from it. The other pair of arms (designated by $d'$) have no beaters attached to them, but there is a rake-head, E, near or at their ends, said rake-head being attached to two slides, $f\ f$, which are fitted between proper guides, $g\ g$, on the arms $d'$. The rake-head E, like the beaters $e$, is parallel with the shaft D, and the inner ends of the slides $f\ f$ are attached to levers $h\ h$, the inner ends of which are connected by a slot, $i$, and pin $j$, as shown clearly in Fig. 2. The levers $h$ have their fulcrum-pins $k$ in bars $l\ l$ attached to the shaft D. One of the levers $h$ has an arm, $m$, projecting from it, and to this arm a slide, F, is attached, said slide being fitted in a suitable guide, $n$, attached to the shaft D, and having a friction-roller on its outer end, which is acted upon by a cam, G, at the upper end of the upright $c'$, said cam being of such a form as to move the slide F and operate the levers $h\ h$, so that the latter may move the rake-head E in and out on the arms $d'$. As the reel revolves the beaters $e$ of the arms $d$ throw the cut grain on the platform, and when the rake-head $e$ reaches the platform, the former is kept in contact with the cut grain in consequence of the cam G actuating the slide F, said rake-head being kept by said cam in contact with the grain, so that the latter may be discharged upon an endless apron, H, which is directly back of the platform and in a transverse position with the main frame of the machine, as shown clearly in Fig. 1. This endless apron may be constructed of any suitable cloth or flexible fabric, and is provided with teeth $o$, which project from it at right angles; and the apron is fitted upon rollers $p\ p'$, one of which, $p$, is rotated from the driving-wheel I by means of a belt, $g$, the roller $p$, of course, giving motion to the apron H.

Directly over the apron H there are secured longitudinally a series of bars, $r$. These bars are attached permanently to the frame of the machine, and over the discharge end of the apron H they are made deeper than at other points, gradually rising, and having hollows or recesses $s$ in them at their ends, as shown in Fig. 3. The grain rests upon the bars while the teeth $o$ carry it along. The deep portion of the bars $r$ elevate the grain free from the teeth $o$, and the former passes into the hollows or recesses $s$ of the bars $r$. The gavels are taken from these hollows or recesses and bound, the binders standing on a platform, J, which is attached to the back part of the main frame A, and at such a point as to have a proper relative position with the discharge end of the apron H to admit of the binders performing their work with facility.

By this invention, therefore, it will be seen that the grain may be bound into sheaves as it is cut, thereby avoiding much labor without augmenting materially the cost of the construction of the machine over those in general use.

Having thus described my invention, what I claim as new, and desire to secure by Letters Patent, is—

1. A reel for harvesters, provided with one or more sliding rake-heads, E, operated substantially as shown, or in any equivalent way, in combination with a curved or concaved platform, C, endless apron H, and binders' platform J, as and for the purpose specified.

2. The fixed inclined bars $r$, placed over the apron H, the teeth $o$ on said apron, in combination with the binders' platform J, arranged as and for the purpose set forth.

J. B. McCORMICK.

Witnesses:
WM. HAMMOND,
S. THORP.